(12) United States Patent
Robbins

(10) Patent No.: US 8,076,793 B2
(45) Date of Patent: Dec. 13, 2011

(54) MAGNETIC ISOLATION OF POWER SOURCING EQUIPMENT CONTROL CIRCUITRY

(75) Inventor: Steven Andrew Robbins, Calabasas, CA (US)

(73) Assignee: Linear Technology Corporation, Milpitas, CA (US)

(*) Notice: Subject to any disclaimer, the term of this patent is extended or adjusted under 35 U.S.C. 154(b) by 118 days.

(21) Appl. No.: 12/527,067

(22) PCT Filed: Feb. 13, 2008

(86) PCT No.: PCT/US2008/053800
§ 371 (c)(1),
(2), (4) Date: Apr. 15, 2010

(87) PCT Pub. No.: WO2008/100987
PCT Pub. Date: Aug. 21, 2008

(65) Prior Publication Data
US 2010/0201188 A1    Aug. 12, 2010

Related U.S. Application Data

(60) Provisional application No. 60/900,933, filed on Feb. 13, 2007.

(51) Int. Cl.
*H02J 1/00* (2006.01)
*H02J 3/00* (2006.01)
*H04B 3/54* (2006.01)

(52) U.S. Cl. .......................................................... 307/1

(58) Field of Classification Search .................. 307/1, 3, 307/DIG. 1; 340/310.11, 310.17
See application file for complete search history.

(56) References Cited

U.S. PATENT DOCUMENTS

2005/0281326 A1* 12/2005 Yu ................................ 375/222
2006/0164108 A1    7/2006 Herbold

OTHER PUBLICATIONS

European Office Action issued in European Patent Application No. EP 07 852 890.8-1244 dated May 19, 2011.
John Blyer, "Looking for Ethernet Power? Find the Outlet, Nevermore", Mar. 2004, XP002515353, retrieved from the Internet: URL:http://www.joejava.com/poe.htm, retrieved on Feb. 12, 2009.
Chinese Office Action, w/ partial English translation thereof, issued in Chinese Patent Application No. CN 200880004872.8, dated May 25, 2011.

* cited by examiner

*Primary Examiner* — Jared Fureman
*Assistant Examiner* — Carlos Amaya
(74) *Attorney, Agent, or Firm* — McDermott Will & Emery LLP

(57) ABSTRACT

A circuit for providing electrical isolation of Power Sourcing Equipment (PSE) circuitry from external circuitry in a Power over Ethernet (PoE) system has an inductive circuit for providing an isolation barrier to electrically isolate an isolated side of the isolation circuit from a non-isolated side of the isolation circuit. A signal path circuitry is configured for transferring bidirectional and/or unidirectional signals over the isolation barrier between respective nodes at the isolated and non-isolated sides.

24 Claims, 8 Drawing Sheets

MAGNETIC ISOLATION OF POWER SOURCING EQUIPMENT CONTROL CIRCUITRY

This application is a U.S. National Phase under 35 U.S.C. §371 of International Application No. PCT/US2008/053800, filed on Feb. 13, 2008, which in turn claims priority of provisional U.S. patent application No. 60/900,933 filed on Feb. 13, 2007 and entitled "SYSTEMS AND METHODS FOR SUPPORTING POWER OVER ETHERNET SYSTEM", and International Application No. PCT/US2007/022430, filed on Oct. 23, 2007, the disclosures of which Applications are incorporated by reference herein.

TECHNICAL FIELD

This disclosure relates to power supply systems, and more particularly, to circuitry and methodology for isolating Power Sourcing Equipment (PSE) control circuitry in a Power over Ethernet (PoE) system.

BACKGROUND

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a PoE system that involves delivering power over unshielded twisted-pair wiring from a PSE to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature.

The IEEE 802.3af standard requires that PSE ports must be electrically isolated from chassis. Hence, some circuit arrangement must be provided to electrically isolate PSE port control circuitry that controls operations of the PSE with respect to supplying power to PDs linked to particular PSE ports. In particular, the PSE port control circuitry should be isolated from sources of any digital signals supplied to the PSE port control circuitry, circuits that receive any digital signals supplied by the PSE port control circuitry, and/or from power sources needed to operate the PSE port control circuitry.

The conventional approach involves optocouplers used to isolate the digital control interface, and a switching power supply used to provide power to the PSE port control circuitry. For example, FIG. 1 shows a conventional PoE system including PSE port control circuitry 10 isolated from a plurality of digital control and/or status signals using optocouplers 12. Power to run at least part of the PSE port control circuitry 10 is provided by an isolated switching-mode power supply 14. A main power supply 16, typically −48 Vdc, provides power that the PSE port sends to a respective PD.

FIG. 2 shows another example of a conventional PoE system, in which the power to operate the PSE port control circuitry 10 is derived from the main power supply 16 via a non-isolated switching-mode power supply 18.

Among disadvantages of the conventional PSE isolation systems is their high cost that results in the significant increase of the PSE per-port cost due to the use of the optocouplers and switching power supply. Also, the conventional systems suffer from a high level of switching noise caused by the switching power supply, and occupy a very large board space because optocouplers and some components of the switching power supply require a substantial room.

Therefore, it would be desirable to provide PSE isolation without optocouplers and switching power supplies.

SUMMARY OF THE DISCLOSURE

The present disclosure offers novel circuitry and methodology for providing electrical isolation of Power Sourcing Equipment (PSE) circuitry from external circuitry in a Power over Ethernet (PoE) system.

In accordance with one aspect of the disclosure, a PSE isolation circuit comprises an inductive circuit for providing an isolation barrier to electrically isolate an isolated side of the isolation circuit from a non-isolated side of the isolation circuit. A first node is configured at the non-isolated side for providing connection to the external circuitry. A second node is configured at the isolated side for providing connection to the PSE circuitry. A signal path circuitry is configured for transferring a first signal in a first direction from the first node to the second node, and in a second direction from the second node to the first node.

The signal path circuitry may include first and second transfer circuits. The first transfer circuit may be configured for transmitting the first signal in the first direction to the second transfer circuit over the isolation barrier. The second transfer circuit may be configured for transmitting the first signal in the second direction to the first transfer circuit over the isolation barrier.

Also, the signal path circuitry may include a first arbitration circuit having a first input responsive to the first signal transferred from the first node in the first direction, a second input responsive to the first signal transferred in the second direction, a first output for transferring the first signal to the first transfer circuit in the first direction, and a control output. A first gate circuit having an output for transferring the first signal to the first node in the second direction may be controlled by the control output of the first arbitration circuit.

The signal path circuitry may further include a second arbitration circuit having a first input responsive to the first signal transferred from the second node in the second direction, a second input responsive to the first signal transferred in the first direction, a first output for transferring the first signal to the second transfer circuit in the second direction, and a control output. A second gate circuit having an output for transferring the first signal to the second node in the first direction may be controlled by the control output of the second arbitration circuit.

The first arbitration circuit may be configured for preventing the signal path circuitry from producing a feedback signal supplied to the first node when the first signal is transferred from the first node in the first direction The second arbitration circuit may be configured for preventing the signal path circuitry from producing a feedback signal supplied to the second node when the first signal is transferred from the second node in the second direction.

The signal path circuitry may be further configured for transferring a second signal in the second direction from a third node at the isolated side to a forth node at the non-isolated side, and/or for transferring a third signal in the first direction from a fifth node at the non-isolated side to a sixth node at the isolated side.

The first transfer circuit may be configured for time multiplexing of the third signal and the first signal transferred in the first direction. The second transfer circuit may be configured for time multiplexing of the second signal and the first signal transferred in the second direction.

Further, the isolation circuit may comprise synchronization circuitry responsive to a first synchronization signal representing operation of the first transfer circuit and to a second synchronization signal representing operation of the second transfer circuit, for synchronizing the first transfer circuit with the second transfer circuit. The first and second synchronization signals may be respectively produced by first and second state counters that control operations of the first and second transfer circuits. A phase-locked loop responsive to the first and second synchronization signals may be provided for synchronizing the second transfer circuit with the first transfer circuit.

A further inductive circuit may be configured for transferring the first synchronization signal over the isolation barrier. The first synchronization signal may be used for providing isolated power supply for circuits isolated from the external circuitry by the isolation barrier.

In accordance with another exemplary embodiment, the isolation circuit may include synchronization circuitry responsive to a pre-determined synchronization signal transferred from the second transfer circuit to the first transfer circuit, for synchronizing the first transfer circuit with the second transfer circuit.

In particular, the synchronization circuitry may comprise a synchronization controller configured for detecting whether the pre-determined synchronization signal coincides with a state indication signal indicating a state of the first transfer circuit, to control signal transmission via the first transfer circuit.

In accordance with a method of the present disclosure, the following steps are carried out for electrically isolating a power supply circuit in a system for providing power over a communication link:
  providing a magnetic isolation barrier between the power supply circuit and external circuitry,
  transferring a first signal in a first direction from a first circuit node to a second circuit node over the magnetic isolation barrier,
  transferring the first signal in a second direction from the second circuit node to the first circuit node over the magnetic isolation barrier,
  operating a first arbitration circuit responsive to the first signal transferred in the first direction and to the first signal transferred in the second direction, so as to prevent a feedback signal from being supplied to the first node when the first signal is transferred from the first node in the first direction, and
  operating a second arbitration circuit responsive to the first signal transferred in the first direction and to the first signal transferred in the second direction, so as to prevent a feedback signal from being supplied to the second node when the first signal is transferred from the second node in the second direction.

The method may further involve transferring a second signal in the second direction from a third circuit node to a fourth circuit node over the magnetic isolation barrier, and transferring a third signal in the first direction from a fifth circuit node to a sixths circuit node over the magnetic isolation barrier.

In accordance with another aspect of the disclosure, a system for providing power over a communication link has a power supply circuit and an isolation circuit for electrically isolating the power supply circuit from external circuitry. The isolation circuit includes an inductive circuit for providing an isolation barrier to electrically isolate an isolated side of the isolation circuit from a non-isolated side of the isolation circuit.

First, second and third nodes are configured at the non-isolated side for providing connection to the external circuitry. Fourth, fifth and sixth nodes are configured at the isolated side for providing connection to the power supply circuit. Signal path circuitry may be configured for transferring a first signal in a first direction from the first node to the fourth node, and in a second direction from the fourth node to the first node, for transferring a second signal in the second direction from the fifth node to the second node, and for transferring a third signal in the first direction from the third node to the sixth node. The signal path circuitry may include a first transfer circuit and a second transfer circuit.

The first transfer circuit may be configured for time multiplexing the third signal and the first signal transferred in the first direction and producing a first output signal transmitted over the isolation barrier to the second transfer circuit, The second transfer circuit may be configured for time multiplexing the second signal and the first signal transferred in the second direction and producing a second output signal transmitted over the isolation barrier to the first transfer circuit.

The isolation circuit may further comprise an arbitration circuit responsive to the first signal transferred in the first direction and to the first signal transferred in the second direction, for preventing a first feedback signal from being supplied to the first node when the first signal is transferred in the first direction, and for preventing a second feedback signal from being supplied to the fourth node when the first signal is transferred in the second direction.

The isolation circuit may further comprises a phased-lock loop circuit responsive to a first synchronization signal representing operation of the first transfer circuit and to a second synchronization signal representing operation of the second transfer circuit, for synchronizing the first transfer circuit with the second transfer circuit.

Alternatively, the isolation circuit may further comprise a synchronization controller responsive to a pre-determined signal detected in the second output signal, and to a state indication signal indicating a state of the first transfer circuit, for synchronizing the first transfer circuit with the second transfer circuit.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using particular examples of PSE isolation arrangements in a PoE system. It will become apparent, however, that the concepts described herein are applicable to any arrangements for isolating electrical modules in power supply systems.

Figure 1:
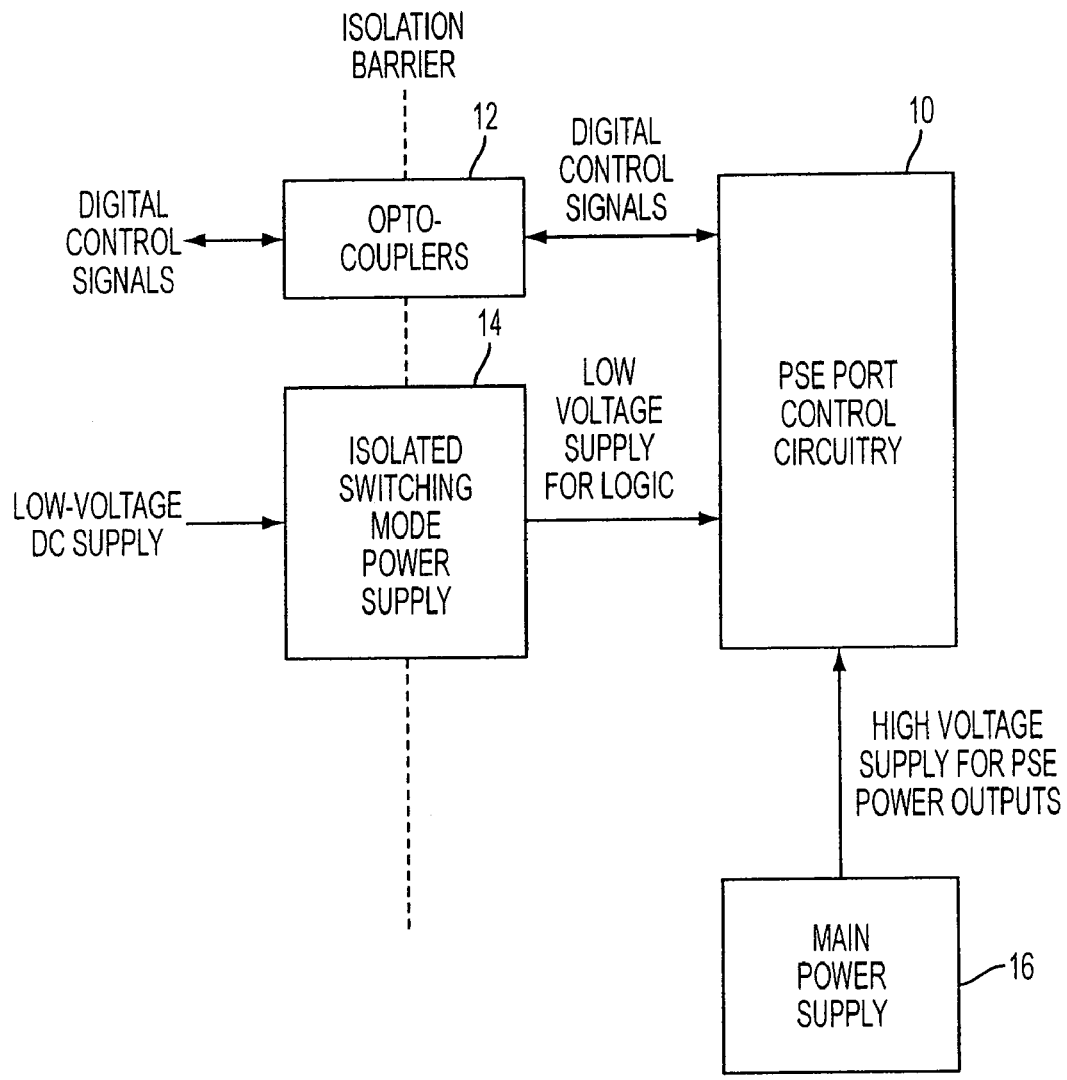
FIGS. 1 and 2 illustrate prior art systems for PSE isolation using opto-couplers.
Figure 2:
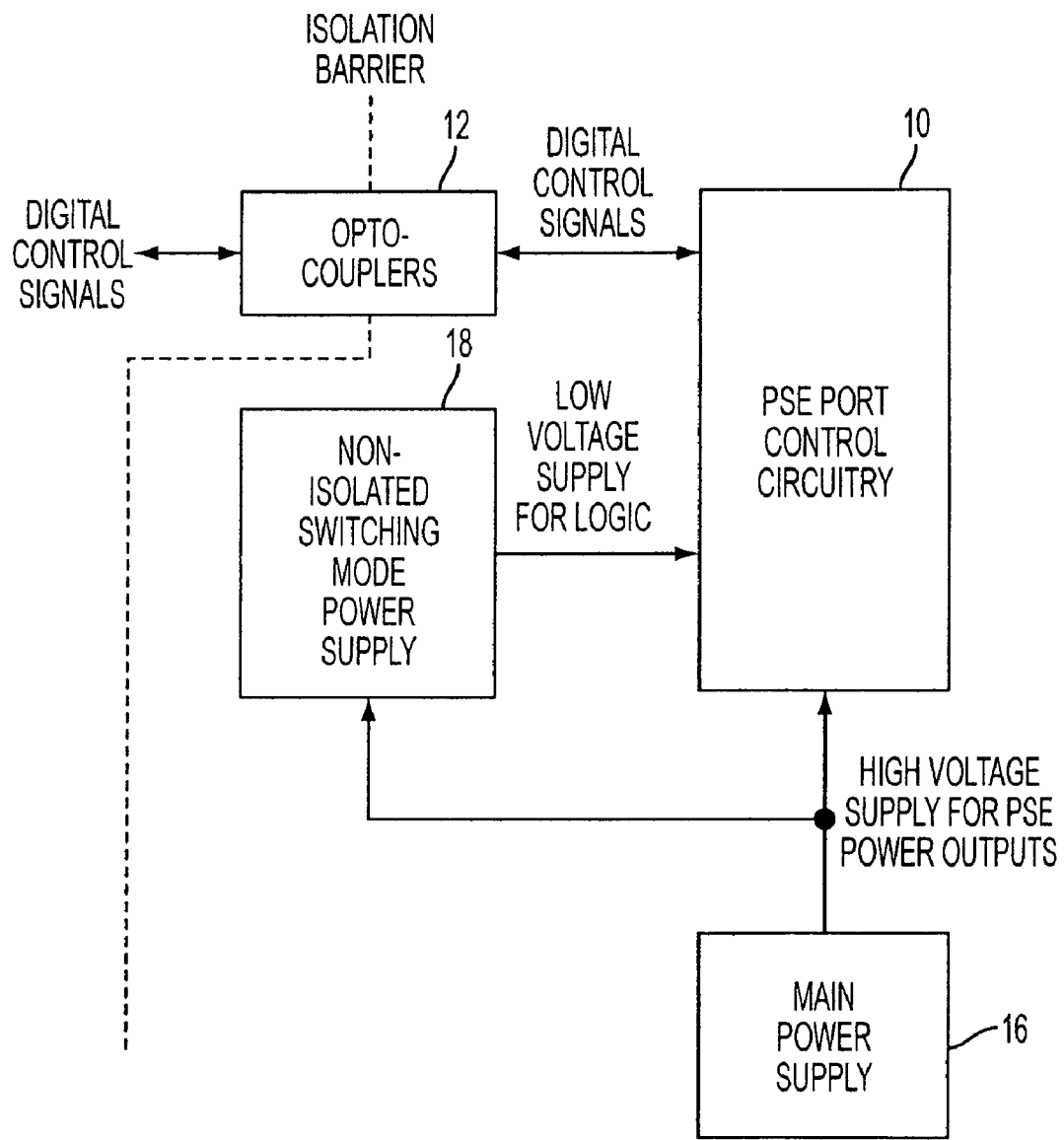
Figure 3:
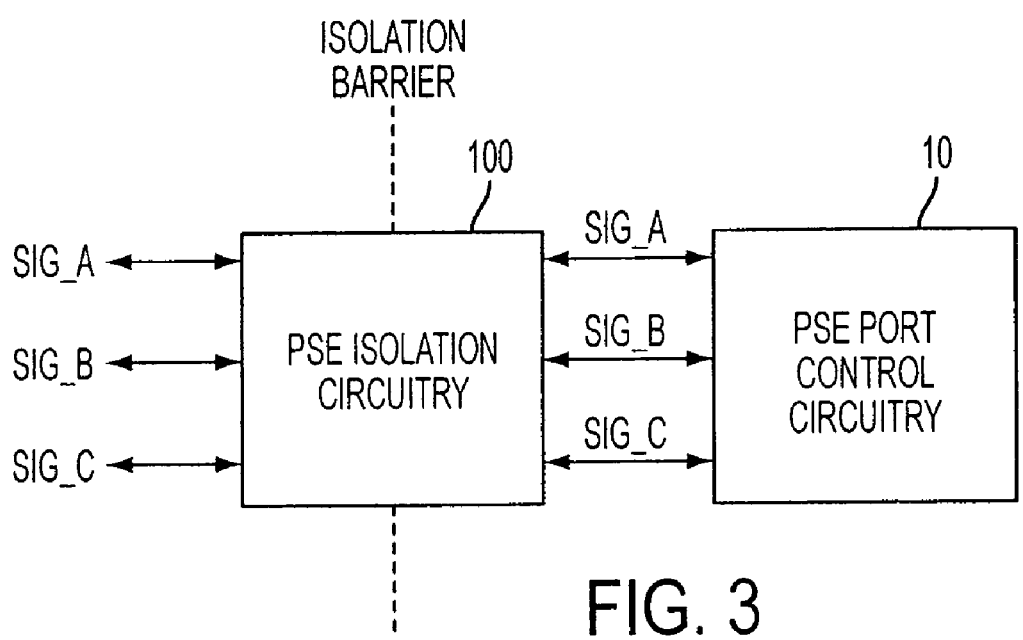
FIG. 3 illustrates exemplary signals transferred through a PSE isolation circuit of the present disclosure.

FIG. 3 illustrates exemplary signals that may be transferred through a PSE isolation circuit 100 of the present disclosure to and/or from an isolated PSE port control circuitry 10. In particular, the PSE isolation circuit 100 may be configured to provide passes for three groups of signals—SIG_A, SIG_B and SIG_C. The group SIG_A may include at least one bi-directional signal, such as a serial data (SDA) signal for an Inter-Integrated Circuit (I²C) bus or a System Management Bus (SMB).

The group SIG_B may include at least one unidirectional signal supplied from the isolated PSE port control circuitry 10 to a circuit, from which the PSE port control circuitry 10 is electrically isolated by the PSE isolation circuit 100. For example, the group SIG_B may include an interrupt signal operable to indicate to a system controller when some event, that requires acknowledgement or service from the system controller, occurs in the PSE port control circuitry 10.

The group SIG_C may include at least one unidirectional signal supplied to the isolated PSE port control circuitry 10 by a circuit, from which the PSE port control circuitry 10 is electrically isolated by the PSE isolation circuit 100. For example, the group SIG_C may include a reset signal operable to set the PSE port control circuitry to a predetermined state.

Figure 4:
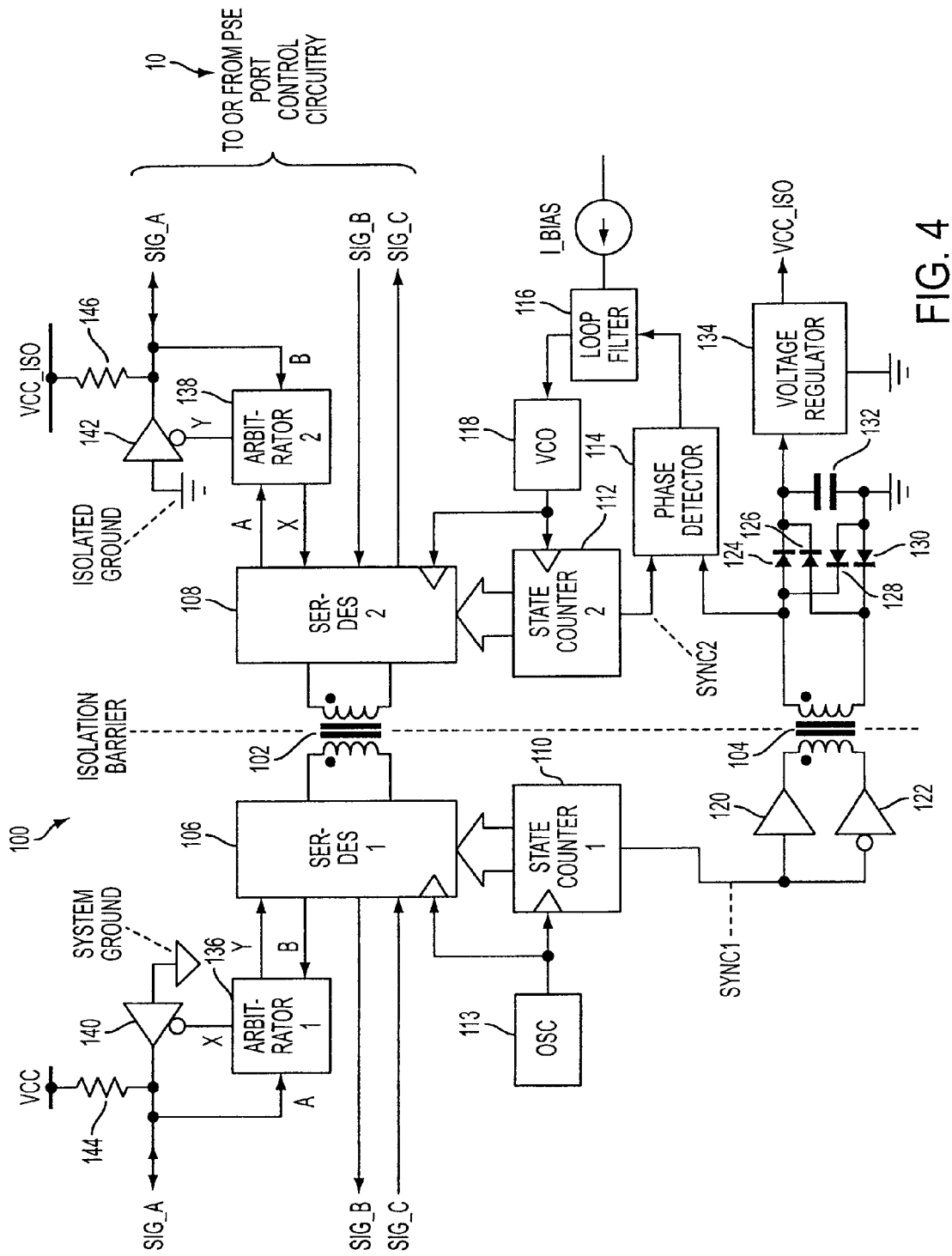
FIG. 4 shows an exemplary embodiment of the PSE isolation circuit of the present disclosure.

FIG. 4 illustrates an exemplary embodiment of a PSE isolation circuit 100 arranged to provide magnetic isolation of PSE port control circuitry 10. The PSE isolation circuit 100 may comprise isolation transformers 102 and 104 that create an electrical isolation barrier between isolated and non-isolated sides of the PSE isolation circuit 100. The isolated side is coupled to the PSE port control circuitry, whereas the non-isolated side is coupled to circuits, from which the PSE port control circuitry is electrically isolated by the PSE isolation circuit 100.

Nodes SIG_A, SIG_B and SIG_C are configured at the isolated side of the PSE isolation circuit 100 for providing connection to the PSE port control circuitry isolated for external circuitry. The respective nodes SIG_A, SIG_B and SIG_C are configured at the non-isolated side for providing connection to the external circuitry. For simplicity, the present disclosure describes handling of a single signal from group SIG_A that may be transferred in two directions between the SIG_A node at the isolated side and the SIG_A node at the non-isolated side. Also, only a single unidirectional signal from each of the groups SIG_B and SIG_C is described. However, one skilled in the art would realize that the PSE isolation circuit of the present disclosure is capable of transferring any number of signals from each of the groups SIG_A, SIG_B and SIG_C between the isolated and non-isolated sides.

A first serializer-deserializer (SERDES1) 106 and a second serializer-deserializer (SERDES2) 108 respectively provided on the non-isolated and isolated sides of the PSE isolation circuit are configured for time multiplexing signals from the groups SIG_A, SIG_B and SIG_C into a single bi-directional serial data stream conveyed by the isolation transformer 102 between the SERDES1 and SERDES2. Further, the SERDES1 is configured for providing time demultiplexing of the serial data stream received from the SERDES2, and the SERDES2 is configured for time demultiplexing of the serial data stream received from the SERDES1.

Data streams transferred though the PSE isolation circuit 100 are composed of data frames. Each data frame corresponds to one complete cycle containing all signals from the groups SIG_A, SIG_B and SIG_C being transferred. Each data frame consists of a number of time slots. In at least one time slot, the SERDES1 may transmit data supplied to the PSE port control circuitry 10 and the SERDES2 receives the data transmitted by the SERDES1. In at least one other time slot, the SERDES2 may transmit data supplied from the PSE port control circuitry 10 and the SERDES1 receives the data transmitted by the SERDES2.

First and second state counters 110 and 112 are provided on the non-isolated and isolated sides for controlling operations of the SERDES1 and SERDES2, respectively. Each time slot in a data frame corresponds to at least one state in each of the state counters 110 and 112. In particular, the SERDES1 is controlled by the state counter 110 to transmit data during some predefined states of this state counter and to receive data during the other predefined states of the state counter 110. The SERDES2 is controlled by the state counter 112 to transmit data during some predefined states of this state counter and to receive data during the other predefined states of the state counter 112. A free-running oscillator (OSC) 113 is provided to generate a clock signal for the state counter 110 and the SERDES1.

The PSE isolation circuit 100 includes a phase-locked loop (PLL) circuit for synchronizing the counters 110 and 112. The PLL circuit includes the state counter 112, a phase detector 114, a loop filter 116 and a voltage-controlled oscillator (VCO) 118 producing clock signals for the state counter 112 and the SERDES2. The state counters 110 and 112 respectively produce synchronizing signals SYNC1 and SYNC2. Via drivers 120 and 122 and the transformer 104, the SYNC1 signal is supplied to one input of the phase detector 114, whereas the SYNC2 signal is provided to the other input of the phase detector 114. When a predetermined phase relationship is established between the SYNC1 and SYNC2 signal indicating that states of the state counters 110 and 112 are properly aligned, the PLL circuit is locked. However, if the phase detector 114 detects a phase error, it produces an error signal filtered by the loop filter 116. The error signal causes the frequency of the VCO 118 to deviate until the predetermined phase relationship is restored. In accordance with an alternative embodiment, a phase/frequency detector (PFD) may be used instead of the phase detector 114.

The SYNC1 signal may also be used for providing power supply at the isolated side. In particular, via a full-wave rectifier circuit composed of diodes 124-130, and a filter capacitor 132, the SYNC1 signal may be supplied to a voltage regulator 134 that produces voltage VCC_ISO for powering at least some of the circuitry at the isolated side.

Figure 5:
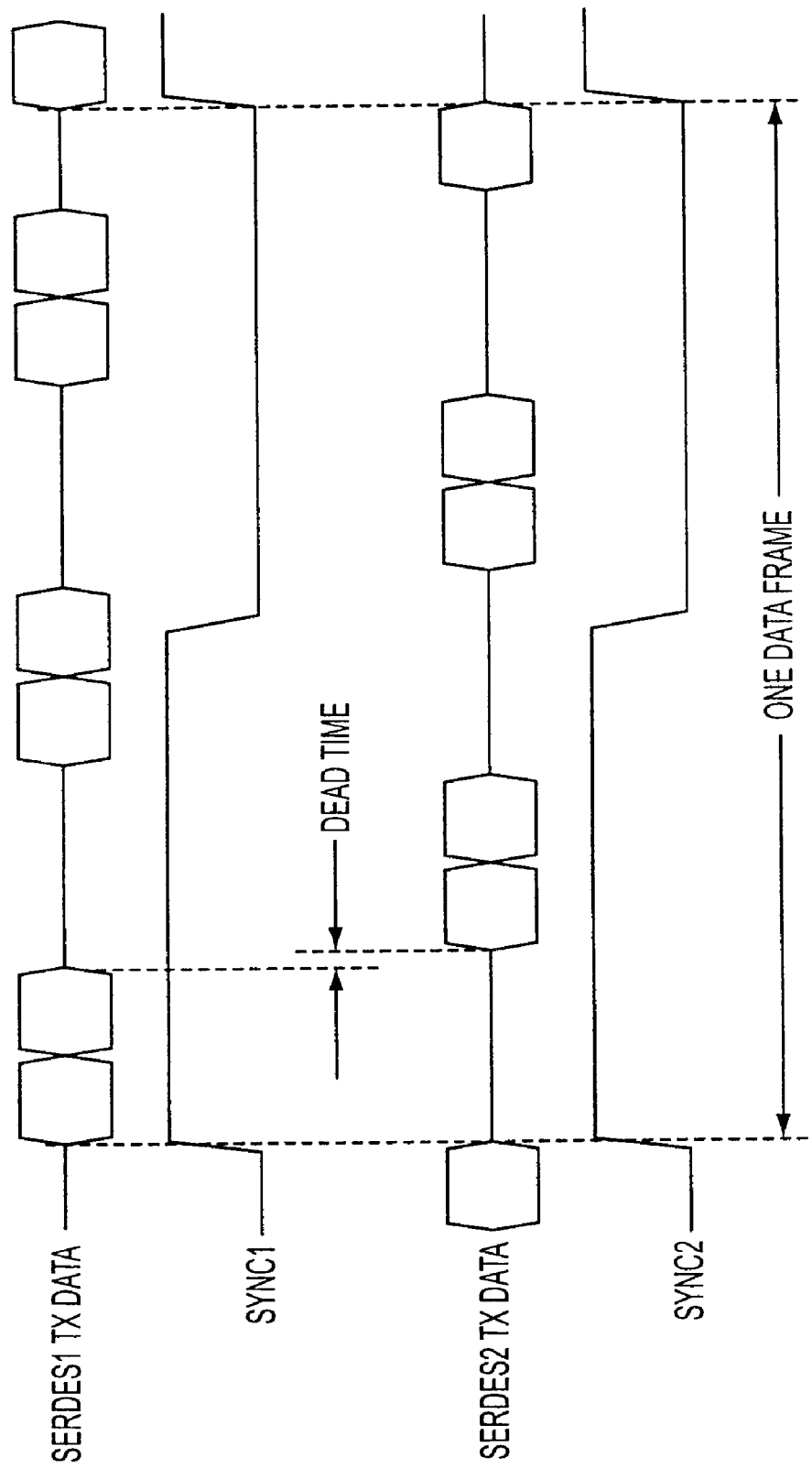
FIG. 5 shows timing diagrams illustrating operation of the PSE isolation circuit in FIG. 4.

FIG. 5 shows an exemplary timing diagram illustrating operations of the SERDES1 and SERDES2 when the PLL circuit is locked. The example in FIG. 5 shows that one data frame consists of 6 time slots, in which the SERDES1 transmits data (SERDES1 TX DATA) in the direction to the PSE port control circuitry, and 5 time slots, in which the SERDES2 transmits data (SERDES2 TX DATA) in the direction from the PSE port control circuitry. As one skilled in the art would realize, the data frame may consist of any predetermined number of time slots, any number of which may be allocated for transmitting data by the SERDES1 and any number of the other time slots may be allocated for transmitting data by the SERDES2.

Because the PLL circuit is locked, signals SYNC1 and SYNC2 are in phase. Therefore, the states of the state counters 110 and 112 are in a predetermined phase relationship established to prevent the transmit time slots of SERDES1 from overlapping with the transmit time slots of SERDES2. Hence, collisions between data transmitted by the SERDES1 and data transmitted by the SERDES2 are avoided. A proper dead time interval may be established between a transmit time slot of SERDES1 and a transmit time slot of SERDES2.

The PLL circuit may produce a lock indication signal to indicate when the PLL circuit is phase-locked. The SERDES2 may be configured to mute transmission of serial data when the lock indication signal indicates that the PLL is not phase-locked. The SERDES2 may be prevented from changing the state of any signals in the SIG_A or SIG_C groups while the lock indication signal indicates that the PLL is not phase-locked.

Also, the PSE isolation circuit 100 may include a current source I_BIAS to provide a DC bias at the output of the loop filter 116. The DC bias results in a phase shift between the serial data steam in the transformer 102 and the clock signal SYNC1 in the transformer 104. This phase shift may be introduced to provide adequate setup and hold times for SERDES1 and SERDES2 when one of them receives serial data from the other. The setup and hold times may be needed to ensure that each SERDES is in a stable state.

In accordance with the present disclosure, an arbitration scheme is provided to prevent a bidirectional signal from the SIG_A group from being stuck in either a high or low state as a result of positive feedback. In particular, the PSE isolation circuit 100 includes a first arbitrator circuit 136 and a second arbitrator circuit 138 respectively provided on the non-isolated and isolated sides. As discussed in more detail later, the arbitration circuits 110 and 112 may provide arbitration required to support passing of bi-directional signals of the SIG_A group through the PSE isolation circuit 100. For simplicity, the present disclosure explains arbitration operations with respect to only one bidirectional signal in the SIG_A group. However, one skilled in the art would realize that any number of bidirectional signals may be transferred by adding more arbitrator circuits, each bidirectional signal having one arbitrator circuit on the non-isolated side and one arbitrator circuit on the isolated side.

Each of the arbitrator circuits 136 and 138 has inputs A and B and outputs X and Y. The input A may correspond to a signal of the SIG_A group supplied to the isolated PSE port control circuitry. The input B may correspond to a signal of the SIG_A group supplied from the isolated PSE port control circuitry.

The arbitrator circuits 136 and 138 interact with the tri-state buffers 140 and 142, respectively. Each tri-state buffer 140 and 142 has data and control inputs and an output. For example, each buffers 140 and 142 may be configured with active low control. When the control input is active, the buffer passes its data input to the output. The X output of the arbitrator circuit 136 and the Y output of the arbitrator circuit 138 are respectively coupled to the control inputs of the tri-state buffers 140 and 142. The data input of the tri-state buffer 140 is coupled to a system ground terminal at the non-isolated side, whereas the data input of the tri-state buffer 142 is coupled to an isolated ground terminal at the isolated side. The outputs of the buffers 140 and 142 are respectively coupled to the SIG_A group terminals at the non-isolated and isolated sides.

Via resistors 144 and 146, VCC and VCC_ISO voltages may be respectively applied to the nodes SIG_A at the non-isolated and the isolated sides. The signal at the SIG_A node at the non-isolated side is pulled up to the voltage VCC, whereas the signal at the SIG_A node at the isolated side is pulled up to the voltage VCC_ISO. The VCC voltage is produced at the non-isolated side, whereas the VCC_ISO voltage is provided at the isolated side. For example, the VCC_ISO voltage may be produced by the voltage regulator 134 based on the SYNC1 signal.

Figure 6:
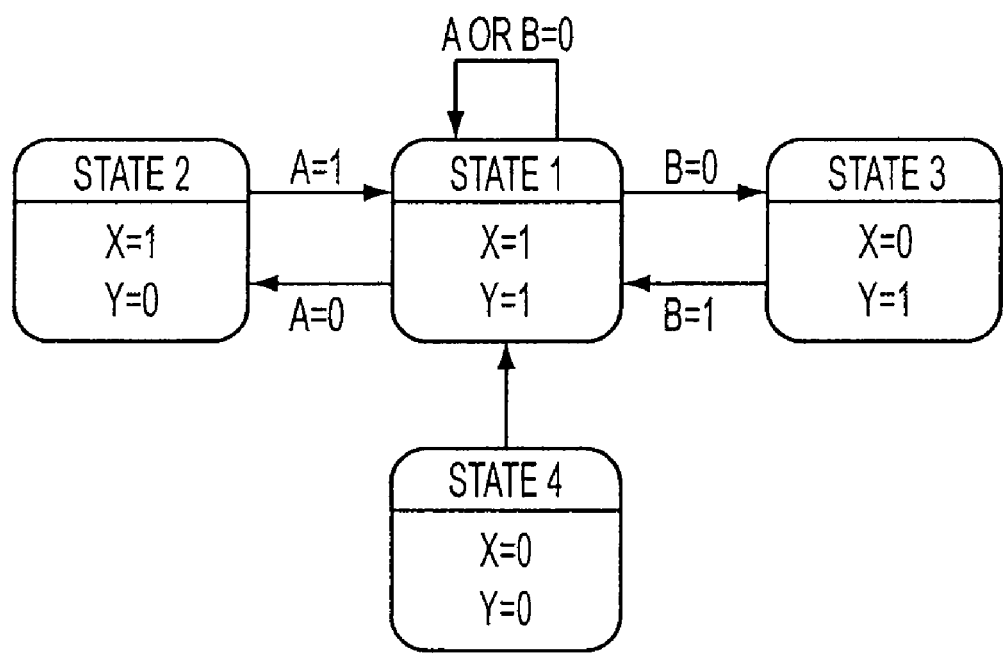
FIG. 6 shows a state diagram illustrating operation of the arbitrator circuits in FIG. 4.

Each of the arbitrator circuits 136 and 138 may implement one instance of a state machine. FIG. 6 shows a state diagram illustrating operations of each of the arbitrator circuits 136 and 138. As discussed above, each arbitrator circuit 136 and 138 has outputs X and Y. The states of these outputs are determined by the inputs A and B.

In the initial phase, inputs A and B are at a high level (A=1, B=1), and both arbitrator circuits 136 and 139 are in state 1, where outputs X and Y are both at a high level (X=1, Y=1). When a signal in the SIG_A group transferred from the non-isolated side of the PSE isolation circuit 10 to the PSE port control circuitry 10 goes low, a low level is applied to the arbitrator circuit 136 as the A input (A=0). In response, the arbitrator circuit 136 transfers from state 1 to state 2, where X is at a high level (X=1) and Y goes to a low level (Y=0). The output X=1 supplied to the control input of the tri-state buffer 140 disables this buffer preventing it from pulling the input A of the arbitrator circuit 136 to a low level.

The output Y=0 propagates through the SERDES1 and transformer 102 into the SERDES2 that produces the A input to the arbitrator 138 at a low level (A=0). In response, the arbitrator 138 also goes from state 1 to state 2, causing the Y output to go low (Y=0). The low level of the Y output supplied to the control input of the tri-buffer 142 controls the buffer 142 pulling its output to a low level. The low level signal at the buffer output is supplied as a respective signal in the SIG_A group to the PSE port control circuitry 10. Hence, the low level of a signal in the SIG_A group is transferred via a magnetic isolation barrier from the non-isolated side of the PSE isolation circuit 100 to the PSE port control circuitry 10.

When the signal transferred from the non-isolated side goes high, the A input of the arbitration circuit 135 becomes high (A=1), and the arbitrator circuit 136 returns to state 1. In this state, the Y output of the arbitrator circuit 136 goes high. The respective high level signal propagates though the SERDES1 and the transformer 102 into the SERDES2 causing the A input of the arbitrator circuit 138 to go high. In response, the arbitrator circuit 138 also returns to state 1. The Y output of the arbitrator circuit 138 goes high controlling the tri-state buffer 142 to produce a high level at its output. Hence, a high level is transferred from the non-isolated side of the PSE isolation circuit 100 to the PSE port control circuitry 10.

When a signal in the SIG_A group at the isolated side is pulled low by the PSE port control circuitry 10, the B input of the arbitrator circuit 138 goes low causing the arbitrator circuit 138 to go to state 3, where X=0 and Y=1. A low level at the X output of the arbitrator circuit 138 propagates via the SERDES2 and the transformer 102 into the SERDES1 causing the B input of the arbitrator circuit 136 to go low. In response, the arbitrator circuit 136 also goes to state 3. The X output of the arbitrator circuit 136 goes low controlling the tri-state buffer 140 to produce a low level at its output. Hence, a low level is transferred from the PSE port control circuitry 10 via the magnetic isolation barrier to the non-isolated side of the PSE isolation circuit 100.

The arbitration circuits 136 and 138 may remain in the state 3 until the signal transferred from the PSE port control circuitry 10 goes to a high level. In response to the high level of this signal supplied at the B input of the arbitrator circuit 138, this circuit returns to state 1. The X output of the arbitration circuit 138 propagates via the SERDES2 and the transformer 102 into the SERDES2 resulting in a high level at the B input of the arbitration circuit 136. In response, this arbitration circuit also returns to state 1 producing a high level at the X output that controls the tri-state buffer 140 to provide a high level at its output. Hence, a high level is transferred from the PSE port control circuitry 10 via the magnetic isolation barrier to the non-isolated side of the PSE isolation circuit 100.

A signal in the SIG_A group would be stuck in a low state, if in any arbitrator circuit 136 or 138, both outputs X and Y are at a low level at the same time (X=0, Y=0). This illegal state is represented by state 4 of the state diagram. If any of the arbitrator circuits 136 and 138 goes in state 4, it will immediately transition to state 1 without any conditions. Also, if for any reasons, both inputs A and B go to a low level simultaneously, each of the arbitrator circuits 136 and 138 will remain in state 1.

Accordingly, the arbitration scheme of the present disclosure enables the PSE isolation circuit 100 to transfer bidirectional signals between the non-isolated side and the isolated PSE port control circuitry 10. As both arbitrator circuits 136 and 138 switches only between state 1 and state 2 (when a signal is supplied from the non-isolated side to the isolated side) or only between state 1 and state 3 (when a signal is supplied from the isolated side to the non-isolated side), no feedback loop can be created while a signal is being transferred through the PSE isolation circuit 100. Therefore, bidirectional signals are prevented from being stuck in either a high state or a low state due to the positive feedback.

Figure 7:
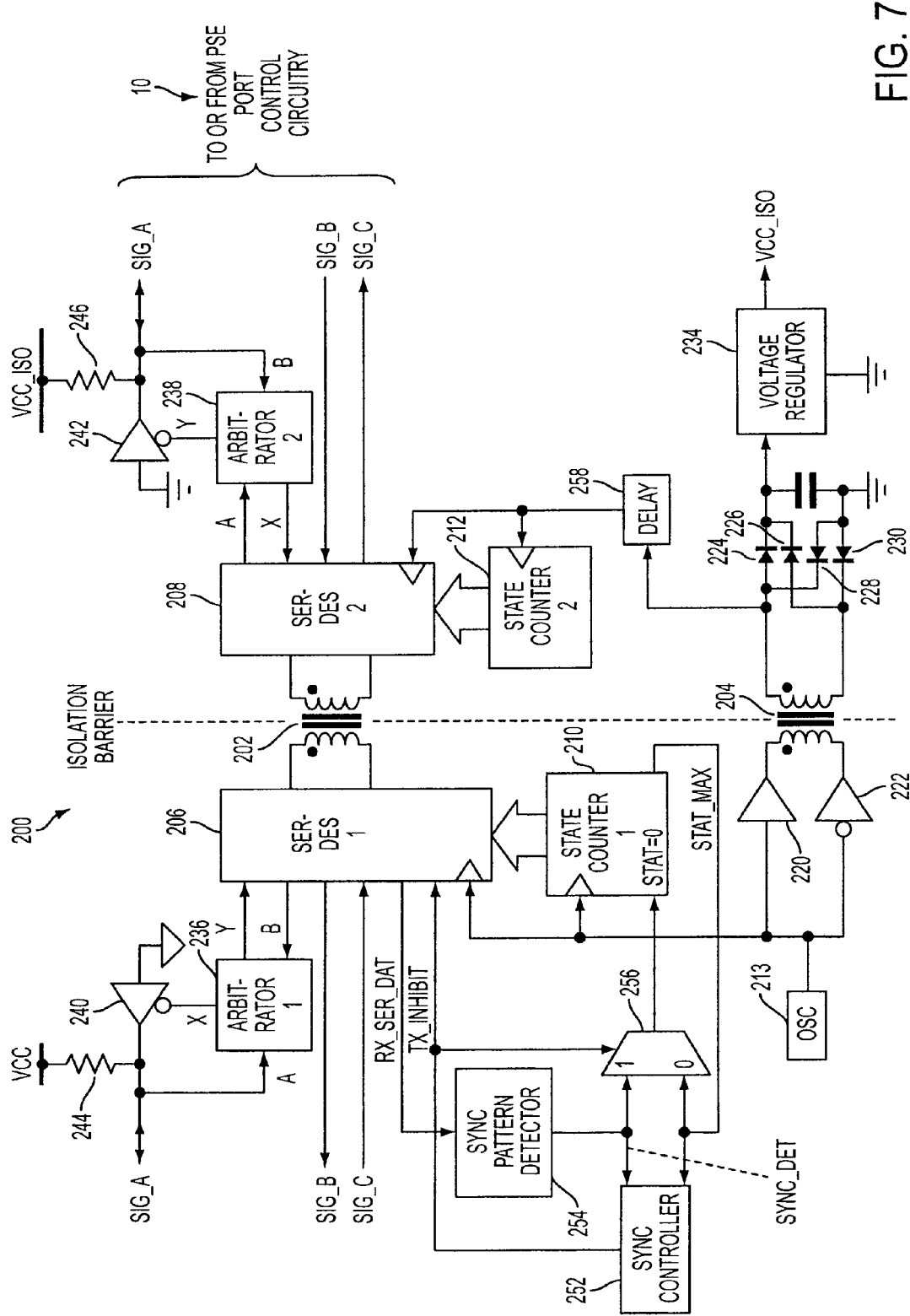
FIG. 7 illustrate another exemplary embodiment of the PSE isolation circuit of the present disclosure.

FIG. 7 illustrates a PSE isolation circuit 200 in accordance with another exemplary embodiment of the present disclosure. Similarly to the circuit shown in FIG. 4, the PSE isolation circuit 200 is configured to magnetically isolate the PSE port control circuitry 10 and to provide passes for three groups of signals—SIG_A, SIG_B and SIG_C. The group SIG_A may include at least one bi-directional signal, such as a serial data (SDA) signal for an Inter-Integrated Circuit ($I^2C$) bus or a System Management Bus (SMB). The group SIG_B may include at least one unidirectional signal supplied from the isolated PSE port control circuitry 10 to a circuit, from which the PSE port control circuitry 10 is electrically isolated by the PSE isolation circuit 200. The group SIG_C may include at least one unidirectional signal supplied to the isolated PSE port control circuitry 10 by a circuit, from which the PSE port control circuitry 10 is electrically isolated by the PSE isolation circuit 200.

The PSE isolation circuit 200 may comprise isolation transformers 202 and 204 that create an electrical isolation barrier between isolated and non-isolated sides of the PSE isolation circuit 200. The isolated side is coupled to the PSE port control circuitry 10, whereas the non-isolated side is coupled to circuits, from which the PSE port control circuitry 10 is electrically isolated by the PSE isolation circuit 200.

In the PSE isolation circuit 200, circuitry that provide passes from signals in the groups SIG_A, SIG_B and SIG_B comprise elements similar to the respective elements of the PSE isolation circuit 100. However, instead of the PLL circuit, the PSE isolation circuit 200 includes a synchronization circuit that uses a special synchronization pattern created in the bidirectional serial data stream. The synchronization circuit may comprise a synchronization controller 252, a synch pattern detector 254 and a multiplexer 256.

The output of the free-running oscillator 213 provides clock input signals for the SERDES1 and the state counter 210. Further, by contrast with the PSE isolation circuit 100, the output signal of the oscillator 213 is transferred, via drivers 220 and 222, the transformer 204 and a delay circuit 258, to clock inputs of the SERDES2 and the state counter 212. The delay circuit 258 may be used to create an appropriate delay period to provide adequate setup and hold times for the SERDES1 and SERDES2 when one of them receives serial data from the other. For example, the delay period may be on the order of one quarter or one half of a time slot.

Further, the output signal of the oscillator 213 may also be used for providing power supply at the isolated side. In particular, via a full-wave rectifier circuit composed of diodes 224-230, and a filter capacitor 232, the output signal of the oscillator 213 may be supplied to a voltage regulator 234 that produces voltage VCC_ISO for powering at least some of the circuitry at the isolated side.

Figure 8:
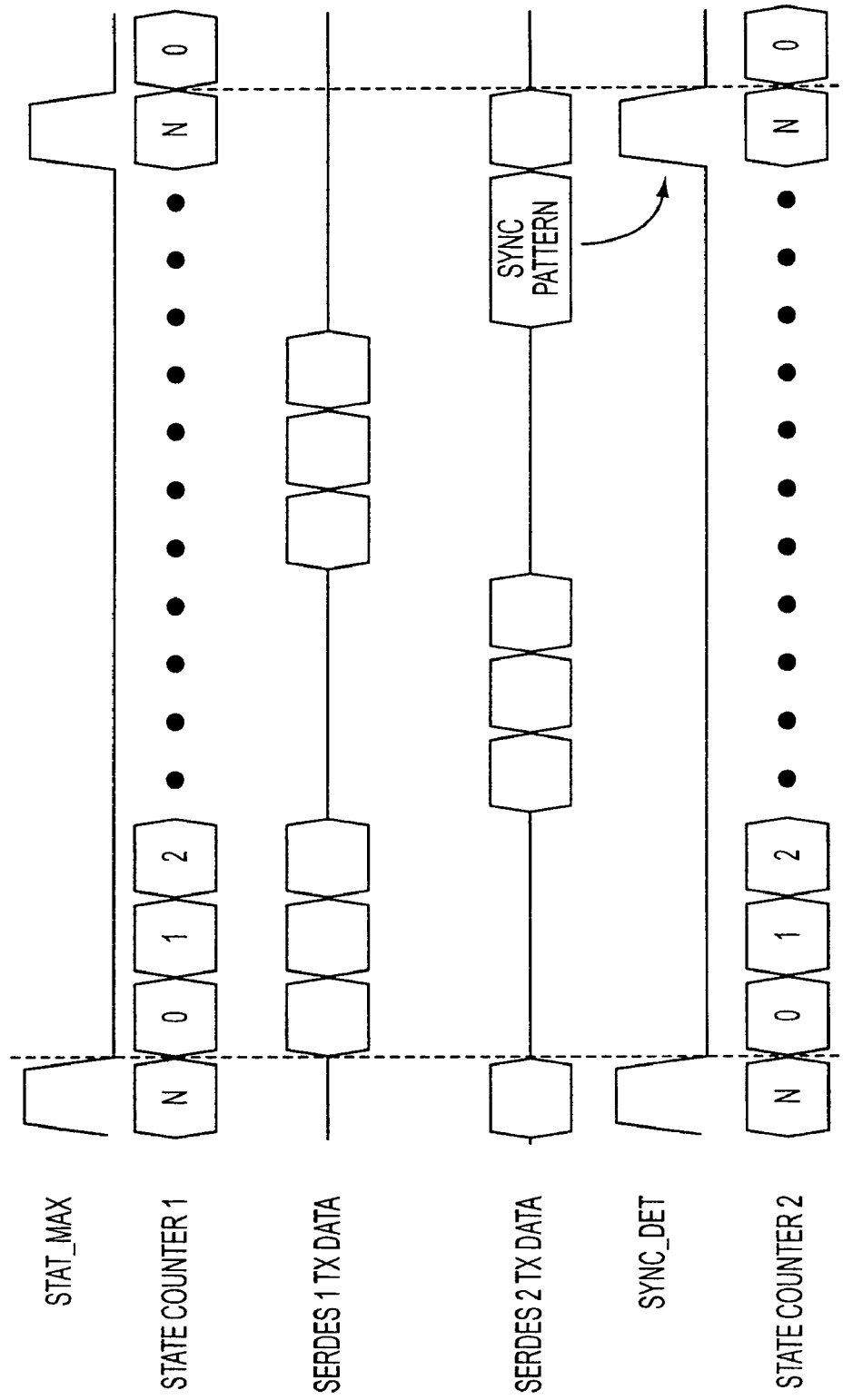
FIG. 8 shows timing diagrams illustrating operation of the PSE isolation circuit in FIG. 7.

As illustrated in FIG. 8, when the SERDES2 transmits serial data (SERDEX2 TX DATA) to SERDES1, the SERDES2 may generate a special synchronization pattern (Sync Pattern). The SERDES1 may be provided with an output RX_SER_DAT to output the serial data received from the SERDES2. This output may be connected to the sync pattern detector 254 that detects the synchronization pattern generated by the SERDES2. When the synchronization pattern is detected, a signal SYNC_DET at the output of the sync pattern detector 254 may go high.

At power-up, the SERDES1 and SERDES2 are initially misaligned. To prevent collision between data transmitted by the SERDES1 and SERDES2, the sync controller 252 produces a transmission inhibit signal TX_INHIBIT at a high level. This signal is supplied to the SERDES1 to prevent it from transmitting data. As a result, the SERDES1 is able only to receive data transmitted from the SERDES2. Hence, the SERDES1 is also able to receive the synchronization pattern generated by the SERDES2.

As shown in FIG. 8, the first state counter 210 (STATE COUNTER 1) sequences through a number of states—from state 0 to state N. The second state counter 212 (STATE COUNTER 2) also sequences from state 0 to state N. The TX_INHIBIT signal produced by the sync controller 252 controls the multiplexer 256 having input 1 and input 0. When the TX_INHIBIT signal is high, it controls the multiplexer 256 to pass input 1 to its output. The input 1 is supplied from the output SYNC_DET of the sync pattern detector 254. Also, the SYNC_DET signal is provided to the sync controller 252. When the TX_INHIBIT signal is a high level, the multiplexer 256 passes the SYNC_DET signal to a preset input STAT=0 of the state counter 210. As a result, the state counter 210 is set into state 0. Hence, the state counter 210 is forced into state 0 when the synchronization pattern is detected. The SERDES2 that produces the synchronization pattern is controlled by the second state counter 212 and generates the synchronization pattern when the state counter 212 is in a predefined state. Therefore, when the state counter 210 is set into state 0 in response to the synchronization pattern, the state counter 210 is being synchronized with the state counter 212.

The state counter 210 produces a pulse signal STAT_MAX at the end of each data frame. For example, the STAT_MAX pulse may be generated when the state counter 210 is in the state N. The STAT_MAX signal is supplied to the sync controller 252 and to input 0 of the multiplexer 256. When the state counters 210 and 212 are properly aligned, the pulse STAT_MAX occurs concurrently with the SYNC_DET pulse. If these pulses are concurrent for a predetermined number of consecutive data frames, the sync controller 252 sets the TX_INHIBIT output to a low level, enabling the SERDES1 to begin transmission of serial data (SERDES1 TX DATA) to the SERDES2. Also, a low level at the TX_INHIBIT output controls the multiplexer 256 to pass the input 0 supplied with the STAT_MAX pulse to the input of the state counter 210.

If the sync controller 252 detects that the SYNC_DET pulse and the STAT_MAX pulse are not concurrent for a predetermined number of consecutive data frames, the sync controller 252 sets the TX_INHIBIT output to a high level, preventing the SERDEX1 from transmitting data to the SERDEX2. Thereafter, the alignment procedure described above repeats.

The synchronization scheme described above prevents the PSE isolation circuit 200 from loosing synchronization due to corruption of the serial data. For example, if noise or interference in the serial data stream results in producing a false signal resembling the synchronization pattern, the false signal could set the state counter 210 in state 0 at an inappropriate time causing improper synchronization between the state counter 210 and the state counter 212. However, the sync controller 252 (that detects whether or not the SYNC_DET and the STAT_MAX pulses are concurrent for a predetermined number of consecutive data frames) prevents the state counter 210 from being placed into state 0 in response to a false synchronization pattern.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. In a Power over Ethernet system, an isolation circuit for providing electrical isolation of Power Sourcing Equipment (PSE) circuitry from external circuitry, the isolation circuit comprising:
   a first inductive circuit for providing an isolation barrier to electrically isolate an isolated side of the isolation circuit from a non-isolated side of the isolation circuit,
   a first node configured at the non-isolated side for providing connection to the external circuitry,
   a second node configured at the isolated side for providing connection to the PSE circuitry, and
   signal path circuitry configured for transferring a first signal in a first direction from the first node to the second node, and in a second direction from the second node to the first node;
   the signal path circuitry including:
   a first transfer circuit and a second transfer circuit, the first transfer circuit being configured for transmitting the first signal in the first direction to the second transfer circuit over the isolation barrier, the second transfer circuit being configured for transmitting the first signal in the second direction to the first transfer circuit over the isolation barrier;
   a first arbitration circuit having a first input responsive to the first signal transferred from the first node in the first direction, a second input responsive to the first signal transferred in the second direction, a first output for transferring the first signal to the first transfer circuit in the first direction, and a control output, and
   a first gate circuit controlled by the control output of the first arbitration circuit and having an output for transferring the first signal to the first node in the second direction.

2. The isolation circuit of claim 1, wherein the signal path circuitry further comprises a second arbitration circuit having a first input responsive to the first signal transferred from the second node in the second direction, a second input responsive to the first signal transferred in the first direction, a first output for transferring the first signal to the second transfer circuit in the second direction, and a control output.

3. The isolation circuit of claim 2, wherein the signal path circuitry further comprises a second gate circuit controlled by the control output of the second arbitration circuit and having an output for transferring the first signal to the second node in the first direction.

4. The isolation circuit of claim 1, wherein the first arbitration circuit is configured for preventing the signal path circuitry from producing a feedback signal supplied to the first node when the first signal is transferred from the first node in the first direction.

5. The isolation circuit of claim 2, wherein the second arbitration circuit is configured for preventing the signal path circuitry from producing a feedback signal supplied to the second node when the first signal is transferred from the second node in the second direction.

6. The isolation circuit of claim 1, wherein the signal path circuitry is further configured for transferring a second signal in the second direction from a third node at the isolated side to a forth node at the non-isolated side.

7. The isolation circuit of claim 6, wherein the signal path circuitry is further configured for transferring a third signal in the first direction from a fifth node at the non-isolated side to a sixth node at the isolated side.

8. The isolation circuit of claim 7, wherein the first transfer circuit is configured for time multiplexing of the third signal and the first signal transferred in the first direction.

9. The isolation circuit of claim 8, wherein the second transfer circuit is configured for time multiplexing of the second signal and the first signal transferred in the second direction.

10. The isolation circuit of claim 1, further comprising synchronization circuitry responsive to a first synchronization signal representing operation of the first transfer circuit and to a second synchronization signal representing operation of the second transfer circuit, for synchronizing the first transfer circuit with the second transfer circuit.

11. The isolation circuit of claim 10, further comprising a first state counter for controlling the first transfer circuit and a second state counter for controlling the second transfer circuit, the first and second state counters being configured for respectively producing the first and second synchronization signals.

12. The isolation circuit of claim 11, wherein the synchronization circuitry comprises a phase-locked loop responsive to the first and second synchronization signals for synchronizing the second transfer circuit with the first transfer circuit.

13. The isolation circuit of claim 10, further comprising an isolated power supply circuit for providing isolated power supply for circuits isolated from the external circuitry by the isolation barrier, based on the first synchronization signal.

14. The isolation circuit of claim 13, further comprising a second inductive circuit for transferring the first synchronization signal over the isolation barrier.

15. The isolation circuit of claim 1, further comprising synchronization circuitry responsive to a pre-determined synchronization signal transferred from the second transfer circuit to the first transfer circuit, for synchronizing the first transfer circuit with the second transfer circuit.

16. The isolation circuit of claim 15, wherein the synchronization circuitry comprises a synchronization controller configured for detecting whether the synchronization signal coincides with a state indication signal indicating a state of the first transfer circuit, to control signal transmission via the first transfer circuit.

17. A method for electrically isolating a power supply circuit in a system for providing power over a communication link, the method comprising the steps of:
providing a magnetic isolation barrier between the power supply circuit and external circuitry,
transferring a first signal in a first direction from a first circuit node to a second circuit node over the magnetic isolation barrier,
transferring the first signal in a second direction from the second circuit node to the first circuit node over the magnetic isolation barrier,
operating a first arbitration circuit responsive to the first signal transferred in the first direction and to the first signal transferred in the second direction, so as to prevent a feedback signal from being supplied to the first node when the first signal is transferred from the first node in the first direction, and
operating a second arbitration circuit responsive to the first signal transferred in the first direction and to the first signal transferred in the second direction, so as to prevent a feedback signal from being supplied to the second node when the first signal is transferred from the second node in the second direction.

18. The method of claim 17, further comprising the steps of:
transferring a second signal in the second direction from a third circuit node to a fourth circuit node over the magnetic isolation barrier, and
transferring a third signal in the first direction from a fifth circuit node to a sixths circuit node over the magnetic isolation barrier.

19. The method of claim 17, further comprising the steps of:
producing a first synchronization signal representing signal transmission in the first direction,
producing a second synchronization signal representing signal transmission in the second direction, and
comparing the first synchronization signal with the second synchronization signal to synchronize signal transmission in the first direction with the signal transmission in the second direction.

20. The method of claim 17, further comprising the steps of:
producing a pre-determined synchronization signal during signal transmission in the second direction,
producing a state indication signal indicating a state of signal transmission in the first direction, and
detecting whether the synchronization signal coincides with the state indication signal to control signal transmission in the first direction.

21. A system for providing power over a communication link having a power supply circuit and an isolation circuit for electrically isolating the power supply circuit from external circuitry, the isolation circuit comprising:
an inductive circuit for providing an isolation barrier to electrically isolate an isolated side of the isolation circuit from a non-isolated side of the isolation circuit,
first, second and third nodes configured at the non-isolated side for providing connection to the external circuitry,
fourth, fifth and sixth nodes configured at the isolated side for providing connection to the power supply circuit, and
signal path circuitry configured for transferring a first signal in a first direction from the first node to the fourth node, and in a second direction from the fourth node to the first node, for transferring a second signal in the second direction from the fifth node to the second node, and for transferring a third signal in the first direction from the third node to the sixth node,
the signal path circuitry including:
a first transfer circuit and a second transfer circuit,
the first transfer circuit being configured for time multiplexing the third signal and the first signal transferred in the first direction and producing a first output signal transmitted over the isolation barrier to the second transfer circuit,
the second transfer circuit being configured for time multiplexing the second signal and the first signal transferred in the second direction and producing a second output signal transmitted over the isolation barrier to the first transfer circuit.

22. The system of claim 21, wherein the isolation circuit further comprises an arbitration circuit responsive to the first signal transferred in the first direction and to the first signal transferred in the second direction, for preventing a first feedback signal from being supplied to the first node when the first signal is transferred in the first direction, and for preventing a second feedback signal from being supplied to the fourth node when the first signal is transferred in the second direction.

23. The system of claim 21, wherein the isolation circuit further comprises a phased-lock loop circuit responsive to a first synchronization signal representing operation of the first transfer circuit and to a second synchronization signal representing operation of the second transfer circuit, for synchronizing the first transfer circuit with the second transfer circuit.

24. The system of claim 21, wherein the isolation circuit further comprises a synchronization controller responsive to a pre-determined signal detected in the second output signal, and to a state indication signal indicating a state of the first transfer circuit, for synchronizing the first transfer circuit with the second transfer circuit.

* * * * *